Oct. 13, 1970 R. E. MALTBY, JR., ET AL 3,533,706
INSPECTING GLASS
Filed May 2, 1966 3 Sheets-Sheet 1
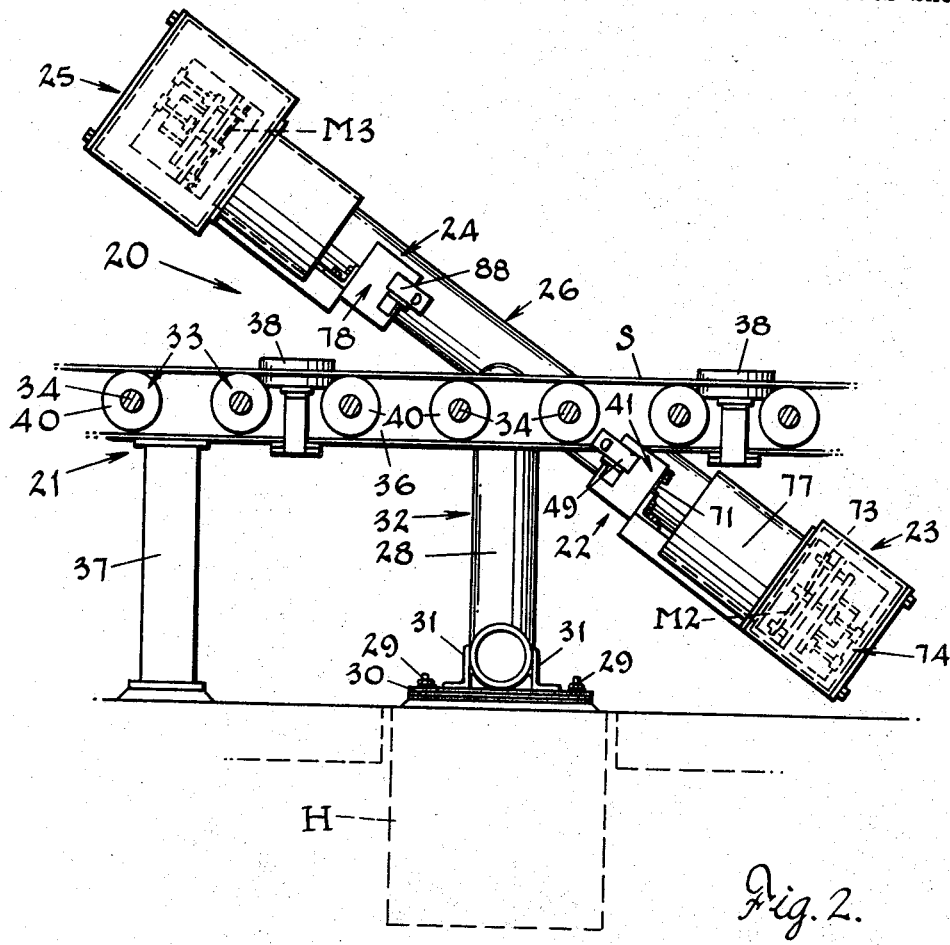
Fig. 2.
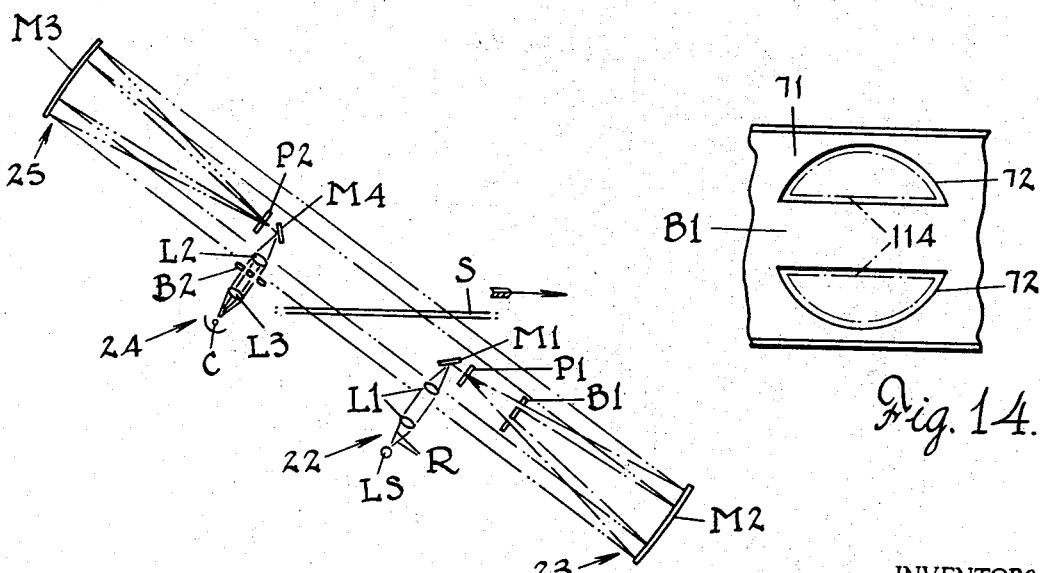
Fig. 1.
Fig. 14.
INVENTORS
Robert E. Maltby, Jr. and
John M. Byal
BY
Nobbe & Swope
ATTORNEYS Oct. 13, 1970   R. E. MALTBY, JR., ET AL   3,533,706
INSPECTING GLASS
Filed May 2, 1966   3 Sheets-Sheet 2

INVENTORS
Robert E. Maltby, Jr. and
BY John M. Byal
Nobbe & Swope
ATTORNEYS

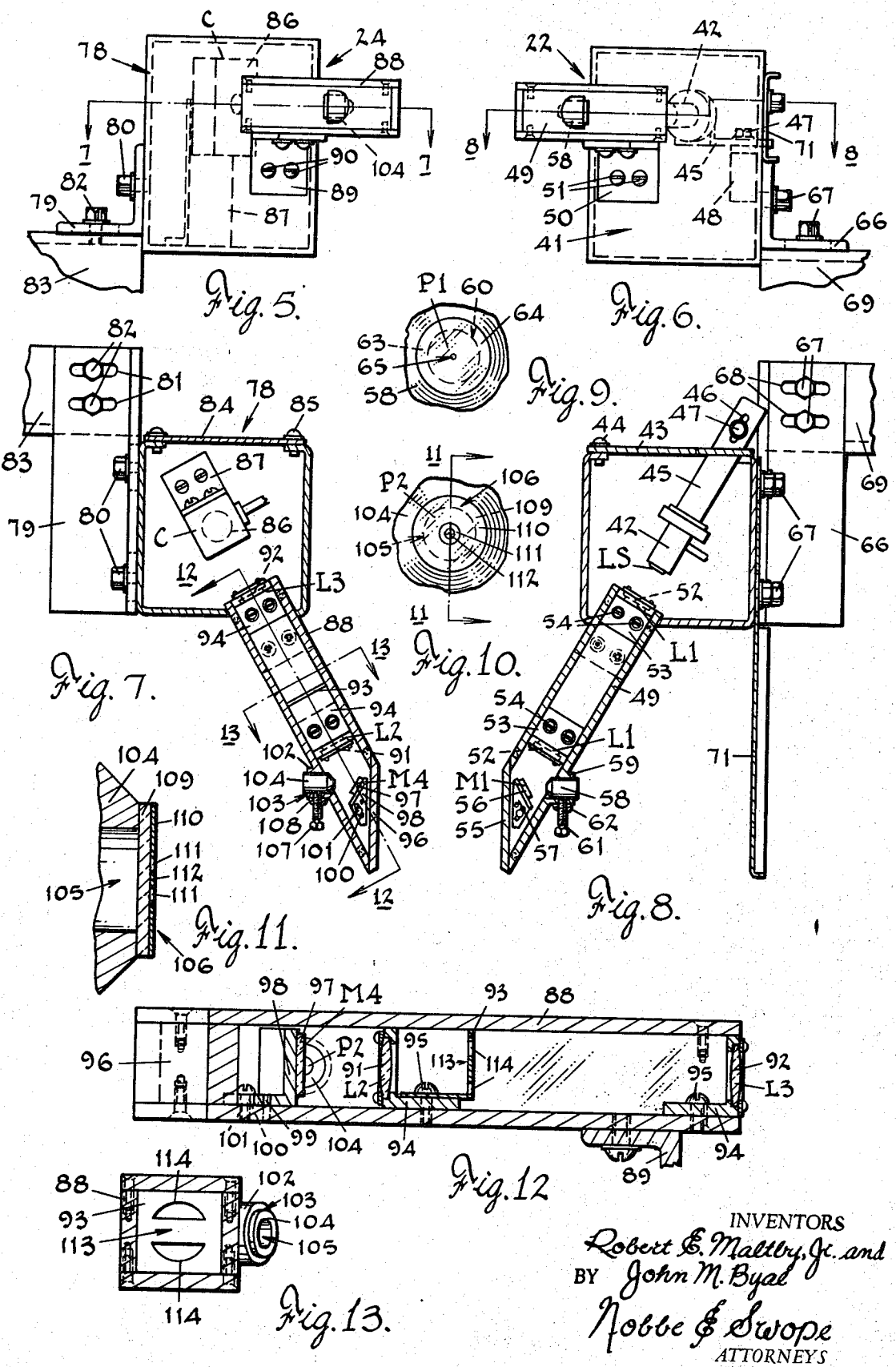

United States Patent Office 3,533,706
Patented Oct. 13, 1970

3,533,706
INSPECTING GLASS
Robert E. Maltby, Jr., Perrysburg, and John M. Byal, Toledo, Ohio, assignors to Libbey-Owens-Ford Glass Company, Toledo, Ohio.
Filed May 2, 1966, Ser. No. 547,002
Int. Cl. G01n 21/16
U.S. Cl. 356—239                                       11 Claims

ABSTRACT OF THE DISCLOSURE

Detecting light scattering surface defects in a glass sheet by directing parallel rays of light through the sheet, focusing the rays after the pass through the sheet to produce an image of the light source, blocking the focused rays not scattered by the defects and the scattered rays deflected outside predetermined angular limits by the defects, and photoelectrically intercepting the remaining rays to create an electrical signal functionally related to the defects.

---

The present invention relates broadly to the inspection of glass and more particularly to an improved method and apparatus for detecting defects which impair optical perfection of glass surfaces.

It has been the continual desire of glass manufacturers to produce ground and polished plate glass having planar surfaces in perfect parallelism with each other and without any surface defects. This has been commercially impractical since such perfection would require extreme costs, as well as time to attain. However, as is well known, certain defects, if not too severe, may be permitted even in plate glass and the nature of the allowable defect will be dependent upon the ultimate use for the glass. For example, highest quality mirror glass has optical requirements far in excess of ordinary commercial plate glass, so that while certain defects will render glass a reject for mirror quality, such defects may be allowable in glazing or other less critical qualities.

Heretofore, various optical systems have been proposed for inspecting ground and polished plate glass to determine whether the glass is acceptable as mirror, or as glazing quality, or is a reject for either use. However, these systems heretofore utilized had certain shortcomings because of which, to the best of applicants' knowledge, none of the prior art device has been completely satisfactory for use on a production line basis.

The common source of error in prior art systems is "noise," i.e. extraneous light, which may be caused by, among other things, dirt or water marks on the glass or light diffraction produced within the optical system, which may be recorded as a defect in the glass.

The primary aim of this invention, therefore, is to provide an improved method and apparatus for detecting surface defects on ground and polished glass.

Another object is to provide a detection system which is free of errors caused by various extraneous conditions other than defects on the glass to be inspected.

A further object is to provide an automatic inspection system capable of simultaneously inspecting larger areas of glass sheets than was heretofore possible with previous inspection systems.

Other objects and advantages of the invention will become more apparent during the course of the following description when read in connection with the accompanying drawings.

In the drawings, wherein like numerals are employed to designate like parts throughout the same:

FIG. 1 is a ray diagram of an inspection device constructed in accordance with this invention illustrating some of the component parts and their relation to the path of movement of the glass;

FIG. 2 is a side elevational view of the inspection device mounted in its operative position adjacent a conveyor;

FIG. 5 is an enlarged view of the detection assembly of the apparatus shown in FIG. 2;

FIG. 6 is an enlarged view of the light source assembly of the apparatus shown in FIG. 2;

FIG. 7 is a sectional view taken along lines 7—7 of FIG. 5;

FIG. 8 is a sectional view taken along line 8—8 of FIG. 6;

FIG. 9 is an enlarged fragmentary view of the apertured plate of the light source assembly;

FIG. 10 is an enlarged fragmentary view of the light ray separator included in the detection assembly;

FIG. 11 is a fragmentary sectional view taken along lines 11—11 of FIG. 10;

FIG. 12 is an enlarged sectional view taken along lines 12—12 of FIG. 7;

FIG. 13 is a sectional view taken along lines 13—13 of FIG. 7; and

FIG. 14 is an enlarged fragmentary view of a blocking mask of the apparatus shown in FIG. 2.

This invention employs a schlieren optical imaging system in which light rays are passed through a transparent member and all unscattered light is interrupted while any light rays which are scattered, due to a defect in the glass, may be viewed on a screen or recorded in some manner by a detection device as an indication of glass defects. However, such a system will record any deviation or scattering of light rays which may be caused by other than glass defects, such as light scatter, caused by dirt or water marks on the glass surface.

Applicants have discovered that the greatest intensity of light caused by glass defects, such as surface pits, occurs at narrow angles of 1° or less, while dust and water marks produce the greatest light at wider angles of more than 1°.

Therefore, according to the invention, the accuracy of a schlieren optical system is increased by also interrupting the wide angled scattered light, as well as, the unscattered light passing through the glass before it reaches the detection device.

Also, according to another aspect of the invention, parabolic mirrors are used to collimate the directed light rays and to focus the collimated rays, after passing through the glass, which will increase the amount of glass area to be viewed at any given time and also increase the accuracy of the optical inspection system.

Referring now more particularly to the drawings, there is disclosed in FIG. 1, a light ray diagram showing the various components of the optical inspection apparatus constructed in accordance with the invention. A source of light LS produces rays R which are passed through a lens system L1 and directed towards an angularly disposed mirror M1, with the lens system forming an image of the original light source at an image plane located on one surface of an apertured plate P1. The aperture of plate P1 now serves as a point source which allows selected light rays to pass through the aperture toward a mirror mask B1 which will allow only certain rays of light to strike the parabolic mirror M2 and be reflected in parallel towards the glass sheet S to be inspected. After passing through the glass, the parallel rays are received on a second parabolic mirror M3 which redirects the rays towards and focuses the rays on the adjacent surface of a plate P2, with the surface having an opaque screen comprising a point stop with an annular light-pervious ring disposed around the point stop. The light rays passing through the annular ring are reflected by a mirror M4 through a lens L2 which produces an image of the mirror mask B1 on a mask B2. The light rays passing through this mask in turn are converged by lens L3 towards a photoelectric cell C which produces a signal as a function of the intensity of the light which indicates the severity of the defects.

Figure 3:
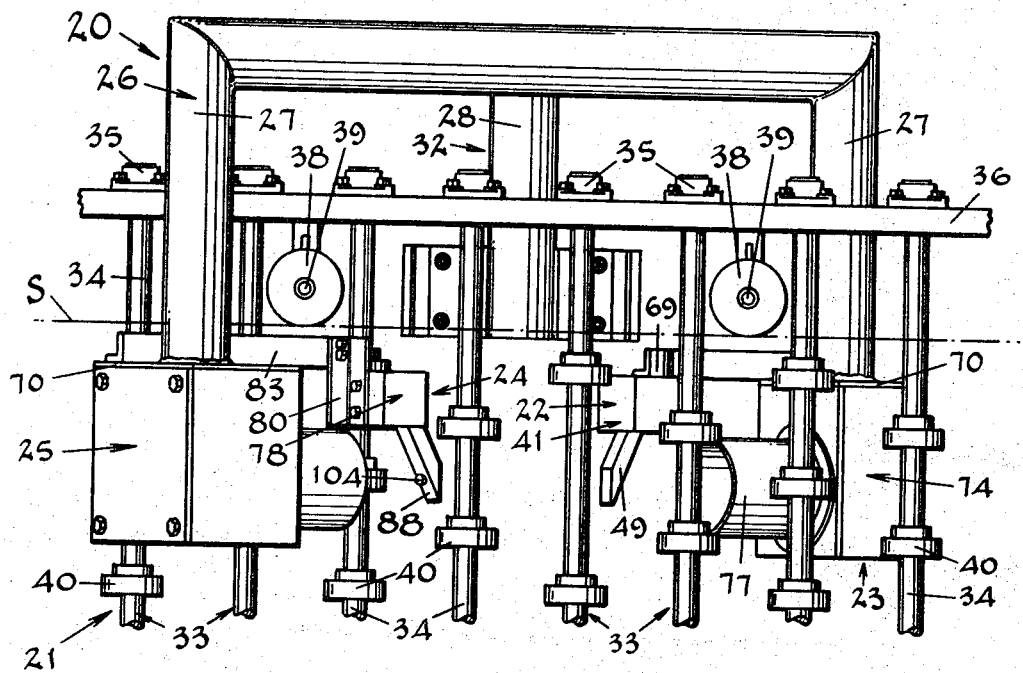
FIG. 3 is a plan view of the apparatus shown in FIG. 2.
Figure 4:
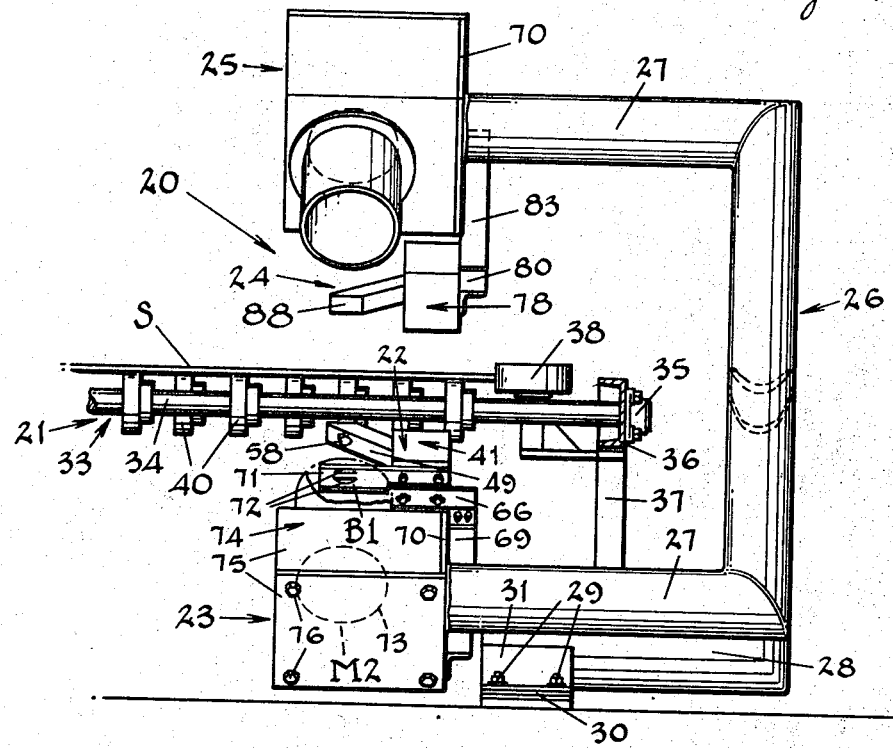
FIG. 4 is an end view of the apparatus shown in FIG. 2.

Turning now to FIGS. 2 through 4, there is shown the optical inspection apparatus 20, constructed in accordance with the invention and mounted in position so as to have components disposed above and below a conveyor 21 which transports a glass ribbon, sheets or plates, along a generally horizontal path. The inspection device generally includes a light source assembly 22 and a first collimating mirror assembly 23 disposed on one side of the conveyor, and a detection assembly 24 and an imaging mirror assembly 25 disposed on the opposite side of the conveyor.

In the illustrative embodiment, the entire inspection device is mounted on a C-shaped support member 26 which has its legs 27 disposed above and below the conveyor 21 such that the plane between the two legs is at an angle with respect to the plane of the conveyor, for a purpose to be described hereinafter. The C-shaped support member is held in fixed position by a support arm 28, which is illustratively shown as L-shaped, with one end of the arm rigidly fixed to the center portion of the C-shaped support member, as by welding. The opposite end of the support arm 28 is held in fixed position inwardly of and below the longitudinal edge of the conveyor 21 and, for this purpose, a plurality of bolts 29 are positioned in a slab located below the conveyor. The bolts are received in apertures in a support plate 30 which is fixed to the support arm 28 through angle irons 31. Therefore, the C-shaped member 26 and support arm 28 and associated elements provide a rigid fixed base or support means 32 for the components of the inspection device. The bolts 29 are secured in an isolated concrete slab H so that any floor vibration will not be transmitted to the support means 32.

The conveyor 21, in the illustrative embodiment, includes a plurality of parallel spaced rolls 33 (FIGS. 3 and 4) each including a shaft 34 having opposite ends journaled in bearings 35 carried by channel members 36 (only one being shown). Each channel member is supported above a floor by spaced pedestals 37 and also supports spaced rollers 38 which are journaled on vertical shafts 39 and act as edge guide means for glass ribbon, sheets or plates carried by the conveyor rolls. The support surface of each roll for the glass includes a plurality of discs 40 spaced along and fixed to the shafts 34 so as to provide limited contact between the glass and the rolls. The discs are formed of a non-abrasive material to insure that the ground and polished surface of the glass will not be marred or scratched by being in contact therewith.

As shown in FIGS. 6, 8 and 9, the light source assembly 22 includes a light-impervious housing 41 enclosing a light source 42, such as a tungsten ribbon filament bulb with a removable cover plate 43 forming one wall of the main body portion of the housing and being held in position by screws 44. The light source 42 is secured to the housing by a bracket 45 having an elongated slot 46, which receives a securing device 47 threaded into a block 48 carried by the plate 43 of the housing. The elongated slot allows for movement of the light source position to properly focus the light rays emanating therefrom, as will be later explained.

The housing also include a tubular extension 49, which is illustratively shown as rectangular, projecting from one wall thereof and held in angular position with respect to the housing wall by angle iron 50 and screws 51. The tubular extension encloses a pair of spaced lenses 52, forming the lens system L1, with each lens fixed within the extension by a bracket 53 and screws 54.

The free end of the tubular extension is enclosed by a plate 55, and a mirror 56, carried by an adjustable bracket 57, is mounted in the tubular extension at its free end. The mirror 56 or M1 is adjustable so as to locate the plane of the mirror in proper relation with respect to the light source to reflect the rays of light emanating from the source to an apertured plate P1, and the adjusting means will be described in detail hereinafter.

The apertured plate P1 is fixed to one end of a cylindrical member 58 which is slidably received in an opening of a lug 59 integral with a wall of the tubular extension. The cylindrical member 58 has an axial opening 60 therein and is held in position by a set screw 61 having a lock nut 62 received thereon. In the illustrative embodiment, the apertured plate P1 (FIG. 9) consists of a transparent member 63 suitably coated or covered with a light-impervious layer 64, and a light aperture 65 is formed in the layer 64 by removing, deleting or omitting a circular portion in the center of the transparent member. As can readily be appreciated, the only opening for allowing light to pass from the housing is the aperture 65.

The housing of the light source assembly is supported on the fixed base 32 by a support means consisting of an angle iron 66 having one leg secured to one wall of the housing by bolts 67 and the opposite leg has elongated slots 68 for receiving threaded members, such as bolts 67. The threaded members in turn are received in an angle iron 69 which is carried by a base plate 70 (FIG. 4) that is rigidly secured to the end of one of the legs 27.

The housing of the light source assembly also carries an elongated reenforced plate 71 which extends outwardly of the housing on the same side as the tubular extension 49 and is provided with a pair of half moon shaped openings 72 (FIG. 14) which, combined with the reenforced plate, form the mirror mask B1.

The collimating mirror assembly 23 (FIG. 2) includes a parabolic mirror 73 adjustably mounted in a housing 74 which is formed by a plurality of plates 75 and plate 70 (FIG. 4) mounted on the free end of the lower leg 27. One of the plates 75 is removably secured by threaded bolts 76 while the plate 75 facing the light source assembly is provided with a large circular opening. The center of the opening is aligned with the axis of the cylindrical member 58 as well as the aperture 65 and is surrounded by a circular light shield 77 extending towards the light source assembly to prevent any extraneous light which may be present adjacent the mirror assembly from striking the surface of the mirror. The mirror 73 is adjustably mounted within the housing by suitable commercially available mounting means (not shown) so as to be capable of being properly oriented with respect to the light source assembly and remaining components of the inspection apparatus.

The imaging or second parabolic mirror assembly 25 is identical in structure to the mirror assembly 23 and is secured to a base plate 70 (FIG. 3) carried by the upper leg 27 of the C-shaped support member.

Turning now to FIGS. 5, 7 and 10 through 13, there is shown the structural details of the detection assembly 24 including a light impervious housing 78 with an angle iron 79 having one leg secured to one wall of the main body of the housing by bolts 80. The other leg of the angle iron 79 is provided with elongated slots 81 which receive bolts 82 threaded into a support member 83 extending from base plate 70 carried by the upper leg 27 of the C-shaped support member (FIG. 3). The main body of the housing includes a removable plate 84 held in position by screws 85. The detection assembly also includes a detection device, such as photoelectric means 86, mounted within the main body of the housing by an L-shaped bracket 87.

The housing 78 has a tubular extension 88, which is illustratively shown as being rectangular, and is held in angular position with respect to one wall of the main body of the housing by a bracket 89 and screws 90. The rectangular extension is provided with a pair of spaced lenses 91 and 92 (FIG. 12) and a mask 93 located therebetween. Each of the lenses is carried by a bracket 94 fixed to one wall of the rectangular extension by a screw 95.

The free end of the tubular extension is enclosed by a plate 96 and a mirror 97 is secured to a wall of the tubular extension by a bracket 98, similar to bracket 57.

The bracket 98 is adjustably mounted within the tubular extension by a pivot pin 99 projecting from one wall of the extension 88 and also includes an elongated slot 100 through which a screw 101 is received and threaded into the wall of the extension. This will allow the mirror 97 to be accurately positioned with respect to the photoelectric means 86 and the plate P2. The bracket 57 is similarly mounted to accurately position the mirror 56 with respect to transparent member 63 and light source 42.

A second wall of the tubular extension is provided with a lug 102 having a circular opening 103 therein for receiving a block member 104. The block member 104 has a centrally located bore 105 therein with one end of the bore enclosed by a screen or separator means 106. The block member 104 is held within the opening of the lug by a set screw 107 having a lock nut 108 received on the threaded portion thereof. The screen 106 consists of transparent member 109 (FIGS. 10 and 11) covered with an impervious coating or cover 110 having a restricted annular opening 111 (FIG. 10) surrounding a small circular impervious section or point stop 112 in the center portion thereof. The center of the impervious central section is in alignment with the axis of the bore 105, for a purpose to be described later. As can readily be appreciated, the only light entering the housing must pass through the light pervious section of the screen 106.

As shown in FIG. 13, the mask 93 includes an impervious plate 113 having two spaced half moon shaped openings 114 therein which are slightly smaller than the openings 72 in the mirror mask plate 71, for a purpose to be described later.

OPERATION

The operation of the apparatus can be appreciated from a reference to FIG. 1. A beam of light consisting of a plurality of divergent rays is produced by the light source 42 in FIG. 8 (LS in FIG. 1) and the rays are directed through the lens system L1 including lenses 52 (FIG. 8).

The light source 42 (FIG. 8) is moved toward or away from the tubular extension to a position where the spaced lenses 52 of the lens system L1 will focus the rays of light and produce an image of the light source at an image plane, located at the apertured plate P1, after being reflected at 90° angles by the mirror 56 (M1 in FIG. 1). Only certain rays of light will pass through the small aperture 65 and these rays will diverge as they are redirected towards the parabolic mirror 73 in FIG. 2 (M2 in FIG. 1). However, certain of the rays are interrupted by the mirror mask means (B1 in FIG. 1 and 71, 72 in FIG. 14) disposed between the apertured plate and the parabolic mirror in the path of the light rays. This will insure that all of the light rays which are directed towards the outer edges of the parabolic mirror will be blocked and thus eliminate any scattering of rays which may be caused by the curved outer edge of the mirror. The mirror M2 in turn redirects the light rays in collimated form towards and through the glass sheet S. If there are no defects, which will cause the light rays to scatter, the rays will remain parallel and be received on and reflected by the second parabolic or imaging mirror M3 disposed on the opposite side of the glass sheet. This imaging mirror will redirect and focus the rays to produce an image of the point light source, produced by aperture P1, at plate P2 so that all unscattered light will be interrupted by the point stop 112 (FIG. 10) disposed in the path of the reflected beams on the screen 106.

However, any light rays which are scattered, due to a defect on the glass surface, will not be imaged on the point stop and some of the scattered rays will thereby pass through the annular ring 111 (FIG. 10) surrounding the point stop and be received by the mirror 97 in FIG. 7 (M4 in FIG. 1) carried within the tubular extension 88 of the detection assembly.

The width of the annular ring is selected so as to allow only light rays which have scattered less than one degree to pass the screen. The rays which pass through the screen will be received by the first lens L2 (FIGS. 1 and 7) which will produce an image of the mirror mask G1 upon the mask 93 in FIG. 12 (B2 in FIG. 1) carried within the tubular extension.

As can readily be appreciated, since the apertures of the mask 93 are slightly smaller than the image of the apertures of the mirror mask 71, some of the rays will be interrupted. This will eliminate any light rays which may have been diffracted by the edges of the apertures 72 of the mirror mask. From this point the uninterrupted reflected light rays will pass through the mask 93 (FIG. 7) and be focused on the photoelectric means 86 (C in FIG. 1) by the lens 92 (L3 in FIG. 1) mounted at the end of the tubular extension.

The photoelectric means will produce an output signal which may be used in various ways to indicate defects on the glass surfaces. For example, the output signal may be recorded on a strip chart recorder or may be used to operate a marking means.

In an actual inspection device constructed according to the invention extremely satisfactory results have been obtained by focusing a 0.030 inch diameter light source on a 0.070 inch diameter point stop and having 0.090 inch diameter annular light pervious ring surrounding the point stop so that the maximum scatter angle of the scattered rays received by the photoelectric means is 5.25 minutes. This virtually eliminated all errors caused by dust, dirt and water marks and produced satisfactory results in inspecting mirror and plate glass quality finish since defects, such as pits, on these quality glasses are very small and produce very limited scatter of light rays.

It also has been determined that the angle of incidence of the light rays with respect to the surface of the glass is important to increase the accuracy of the system. This is based on the possible phenomenon that the surface pits are shaped so as to vary the scatter angle as the angle of incidence is varied. According to tests, best results have been obtained where the angle of incidence of the parallel rays and the adjacent glass surface is 60° or less.

Also, the use of collimating mirrors, such as 10-inch diameter mirrors having a 28 inch focal length will allow the apparatus to inspect a large area at one time as well as having improved accuracy over collimating lenses of equal quality.

It should be noted that the inspection apparatus was used on a continuous production line and the apparatus was completely insensitive to any relative position of the glass, such as the vertical or angular position with respect to a given plane, normally encountered in glass being moved on a conveyor.

As can readily be appreciated, an inspection apparatus, constructed in accordance with the invention, is capable of automatically determining the quality grade of the surfaces of ground and polish plate glass. Since the improved apparatus is insensitive to dirt and water marks, the apparatus is capable of being used on a continuous production line on a glass ribbon which is moving on a conveyor and before it is cut to blank size plates or smaller sizes. This will, of course, increase efficiency because any glass which is not of mirror quality finish can be retained in blank size for use as plate glass since the final inspection may be accomplished before a glass blank has been cut to mirror size pieces.

It is to be understood that the form of the invention herewith shown and described is to be taken as an illustrative embodiment only of the same, and that various changes in the shape, size and arrangement of parts, as well as various procedural changes may be resorted to without departing from the spirit of the invention.

We claim:

1. Apparatus as defined in claim 11, in which said reflecting means has a focal point and said separating means is located at said focal point and includes a light impervious central portion and a restricted light pervious portion surrounding said central portion.

2. Apparatus as defined in claim 11, in which said means producing the beam of light comprises a light source producing a plurality of divergent rays, and including means for collimating said divergent rays towards and through said glass.

3. Apparatus as defined in claim 2, in which said reflecting and collimating means each include a parabolic mirror.

4. Apparatus as defined in claim 2, including an apertured plate spaced from said collimating means and means for focusing said beam of light on said plate which produces a point source of light rays passing through said apertured plate onto said collimating means.

5. Apparatus as defined in claim 4, including mask means located between said apertured plate and said collimating means defining openings in the path of said rays which pass through said apertured plate to pass the central rays while said mask means blocks the rays directed toward the edges of said collimating means.

6. Apparatus as defined in claim 5, including second mask means disposed in the path of said scattered reflected rays between said means for separating the scattered and unscattered light and said detection means, said second mask means defining openings which are smaller than an image of the openings of said first mask means and of identical configuration for interrupting any light rays diffracted by the edges of said openings in said first mask means.

7. In a method of detecting surface defects in a glass sheet having substantially parallel surfaces, wherein rays of light directed through said sheet are partially scattered by said defects, the improvement comprising directing parallel rays of light from a point source through said sheet, focusing the rays after they pass through said sheet to produce an image of said light source, interrupting the focused rays not scattered by defects in said sheet and the scattered rays deflected outside predetermined angular limits by said defects, and intercepting the remaining rays photoelectrically to create an electrical signal as a function of said defects.

8. A method of detecting surface defects in a glass sheet as claimed in claim 7, wherein said step of interrupting includes interrupting scattered rays deflected by an amount greater than one degree.

9. A method of detecting surface defects in a glass sheet as claimed in claim 7, including the steps of reflecting the light rays from said point source in collimated form to direct said parallel rays through said sheet, and blocking a portion of the rays emanating from said point source to eliminate scattering of rays in the reflecting thereof.

10. A method of detecting surface defects in a glass sheet as claimed in claim 7, wherein said step of directing parallel rays of light from a point source includes directing said parallel rays of light toward said sheet at an incident angle less than or equal to 60 degrees.

11. In apparatus for detecting the presence of surface defects in a glass sheet or ribbon having substantially parallel surfaces, including means for producing a beam of light transmitted through said glass which is partially scattered by the presence of defects on the glass, the improvement comprising means for reflecting the scattered and unscattered light towards detection means, and means for separating the scattered and unscattered light and allowing only the portion of the scattered light deflected within predetermined angular limits to pass towards the detection device, said detection means including means for creating a signal as a function of the intensity of the scattered light passing said separating means.

References Cited

UNITED STATES PATENTS

| | | | |
|---|---|---|---|
| 2,547,212 | 4/1951 | Jamison et al. | 250—43.5 |
| 3,084,590 | 4/1963 | Glenn | 350—161 |
| 3,283,309 | 11/1966 | Gaynor | 350—161 |
| 2,873,644 | 2/1959 | Kremen et al. | 250—237 |
| 3,063,331 | 10/1962 | Glenn | 350—161 |
| 3,088,113 | 4/1963 | Rosenthal | 350—161 |
| 3,091,690 | 5/1963 | McHenry | 350—294 |
| 3,199,401 | 8/1965 | Sleighter et al. | 88—14 |
| 3,202,043 | 8/1965 | Galey et al. | 88—14 |

RONALD L. WIBERT, Primary Examiner

P. K. GODWIN, Jr., Assistant Examiner

U.S. Cl. X.R.

350—294; 356—103